(12) United States Patent
Harley et al.

(10) Patent No.: US 7,570,247 B2
(45) Date of Patent: Aug. 4, 2009

(54) MODULAR ASSEMBLY FOR A SELF-INDEXING COMPUTER POINTING DEVICE

(75) Inventors: Jonah Harley, Mountain View, CA (US); Farid Matta, Los Altos, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 430 days.

(21) Appl. No.: 10/722,698

(22) Filed: Nov. 24, 2003

(65) Prior Publication Data

US 2005/0110754 A1 May 26, 2005

(51) Int. Cl.
*G09G 5/00* (2006.01)
(52) U.S. Cl. .................. 345/156; 345/157; 345/167; 345/160; 345/161; 345/184; 361/686; 361/726
(58) Field of Classification Search .......... 345/156, 345/157, 160, 161, 184, 901; 361/686, 726, 361/727, 731, 732
See application file for complete search history.

(56) References Cited

U.S. PATENT DOCUMENTS

| | | | |
|---|---|---|---|
| 3,987,685 A | 10/1976 | Opocensky | |
| 4,670,743 A | 6/1987 | Zemke | |
| 4,719,455 A | 1/1988 | Louis | |
| 5,056,146 A | 10/1991 | Nishide | |
| 5,086,296 A | 2/1992 | Clark | |
| 5,252,952 A | 10/1993 | Frank et al. | |
| 5,263,134 A | 11/1993 | Paal et al. | |
| 5,504,502 A * | 4/1996 | Arita et al. | 345/160 |
| 5,615,083 A * | 3/1997 | Burnett | 361/686 |
| 5,659,334 A | 8/1997 | Yaniger | |
| 5,703,356 A | 12/1997 | Bidiville et al. | |
| 5,704,037 A | 12/1997 | Chen | |

(Continued)

FOREIGN PATENT DOCUMENTS

DE 4033465 5/1991

(Continued)

OTHER PUBLICATIONS

U.S. Appl. No. 11/606,556, filed Nov. 30, 2007, Harley et al.

(Continued)

*Primary Examiner*—Richard Hjerpe
*Assistant Examiner*—Jennifer T Nguyen

(57) ABSTRACT

A pointing device having a puck sub-assembly and a base sub-assembly is disclosed. The puck sub-assembly includes a moveable puck having a user sensor that detects the interaction of a user and the puck. The puck is confined to move within a puck field of motion. The puck sub-assembly includes a support member having an opening therein that determines a boundary for the puck field of motion. The base sub-assembly includes a base surface over which the puck moves, a position detector that measures the position of the puck in the puck field of motion, and an attachment mechanism. The attachment mechanism connects the base sub-assembly to the puck sub-assembly such that the puck sub-assembly is easily removed. The base surface is accessible when the puck sub-assembly is separated from the base assembly. The puck sub-assembly can also include a restoring mechanism that returns the puck to a predetermined area.

9 Claims, 6 Drawing Sheets

U.S. PATENT DOCUMENTS

| | | | |
|---|---|---|---|
| 5,739,821 | A | 4/1998 | Ho et al. |
| 5,808,603 | A | 9/1998 | Chen |
| 5,815,139 | A | 9/1998 | Yoshikawa et al. |
| 5,883,690 | A * | 3/1999 | Meyers et al. ............... 345/161 |
| 5,889,507 | A | 3/1999 | Engle et al. |
| 5,914,465 | A | 6/1999 | Allen |
| 5,956,016 | A | 9/1999 | Kuenzner et al. |
| 6,115,030 | A | 9/2000 | Berstin et al. |
| 6,198,473 | B1 | 3/2001 | Armstrong |
| 6,256,012 | B1 | 7/2001 | Devolpi |
| 6,288,707 | B1 | 9/2001 | Philipp |
| 6,292,174 | B1 | 9/2001 | Mallett et al. |
| 6,326,948 | B1 * | 12/2001 | Kobachi et al. ............ 345/157 |
| 6,430,023 | B1 | 8/2002 | Suzuki |
| 6,492,911 | B1 | 12/2002 | Netzer |
| 6,667,733 | B2 | 12/2003 | Miyoshi |
| 6,753,848 | B2 | 6/2004 | Toshiharu |
| 6,762,748 | B2 | 7/2004 | Maatta et al. |
| 6,816,154 | B2 | 11/2004 | Wong et al. |
| 6,961,052 | B1 | 11/2005 | Vaziri |
| 7,042,441 | B2 | 5/2006 | Adams et al. |
| 7,046,230 | B2 | 5/2006 | Zadesky et al. |
| 7,123,028 | B2 | 10/2006 | Okada et al. |
| 7,158,115 | B2 | 1/2007 | Harley et al. |
| 2002/0163547 | A1 | 11/2002 | Abramson et al. |
| 2003/0048262 | A1 | 3/2003 | Wu et al. |
| 2003/0076301 | A1 | 4/2003 | Tsuk et al. |
| 2003/0095096 | A1 | 5/2003 | Robbin et al. |
| 2004/0108993 | A1 | 6/2004 | Suzuki et al. |
| 2005/0052425 | A1 | 3/2005 | Zadesky et al. |
| 2005/0052426 | A1 | 3/2005 | Hagermoser et al. |
| 2005/0052429 | A1 | 3/2005 | Philipp |
| 2005/0062732 | A1 | 3/2005 | Sinclair et al. |
| 2005/0110755 | A1 * | 5/2005 | Harley et al. ............... 345/160 |
| 2006/0001657 | A1 | 1/2006 | Monney et al. |
| 2006/0038783 | A1 | 2/2006 | Shaw et al. |
| 2006/0176270 | A1 | 8/2006 | Sachs |
| 2006/0192754 | A1 | 8/2006 | Sachs et al. |
| 2006/0267933 | A1 | 11/2006 | Tai et al. |
| 2007/0052691 | A1 | 3/2007 | Zadesky et al. |
| 2007/0247421 | A1 | 10/2007 | Orsley et al. |

FOREIGN PATENT DOCUMENTS

| | | | |
|---|---|---|---|
| DE | 19710686 | | 9/1998 |
| EP | 1 136 939 A2 | | 9/2001 |
| GB | 2247938 | * | 3/1992 |
| WO | WO-00/51358 | | 8/2000 |
| WO | WO-02/03317 | | 1/2002 |
| WO | WO-2006/031332 | | 3/2006 |

OTHER PUBLICATIONS

U.S. Appl. No. 60/794723, filed Apr. 25, 2006, Harley.
U.S. Appl. No. 10/723,957, filed Nov. 24, 2003, Harley.
U.S. Appl. No. 11/407,274, filed Apr. 19, 2006, Orsley.
U.S. Appl. No. 11/923,653, filed Oct. 25, 2007, Orsley.
"Motorola SLVR", www.motorola.com/motoinfo/product/details.jsp, (2007).
Panasonic, "Panasonic Tectile Sheet Type ESP", (Dec. 2005).
Avago Technologies, "AMRI-2000 Data Sheet", (2005).
Avago Technologies, "AMRI-2000-P000 Data Sheet", (Sep. 25, 2007).
"3M Double Coated tapes", *9731 931RW Technical Data*, (Feb. 2005).
"ARS Technica, iPod nano", http://arstechnica.com/reviews/ardware/nano.ars/4., (1998).

* cited by examiner

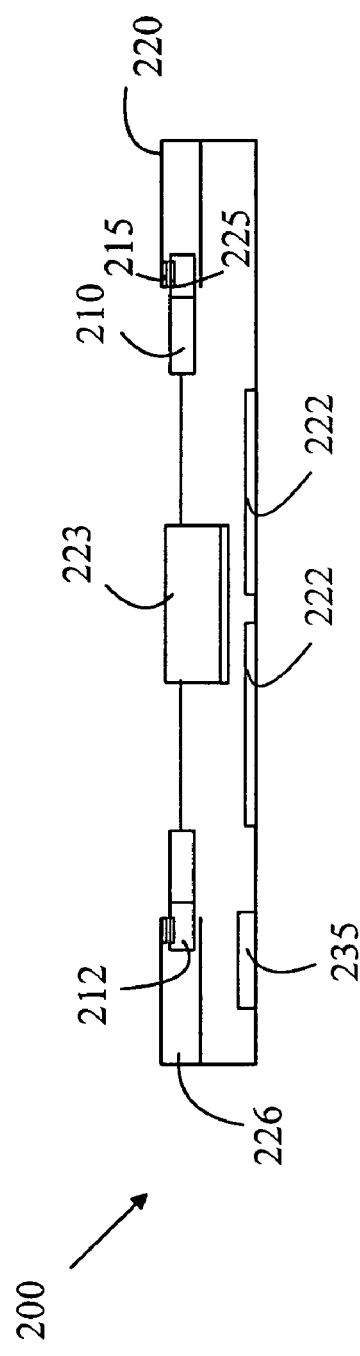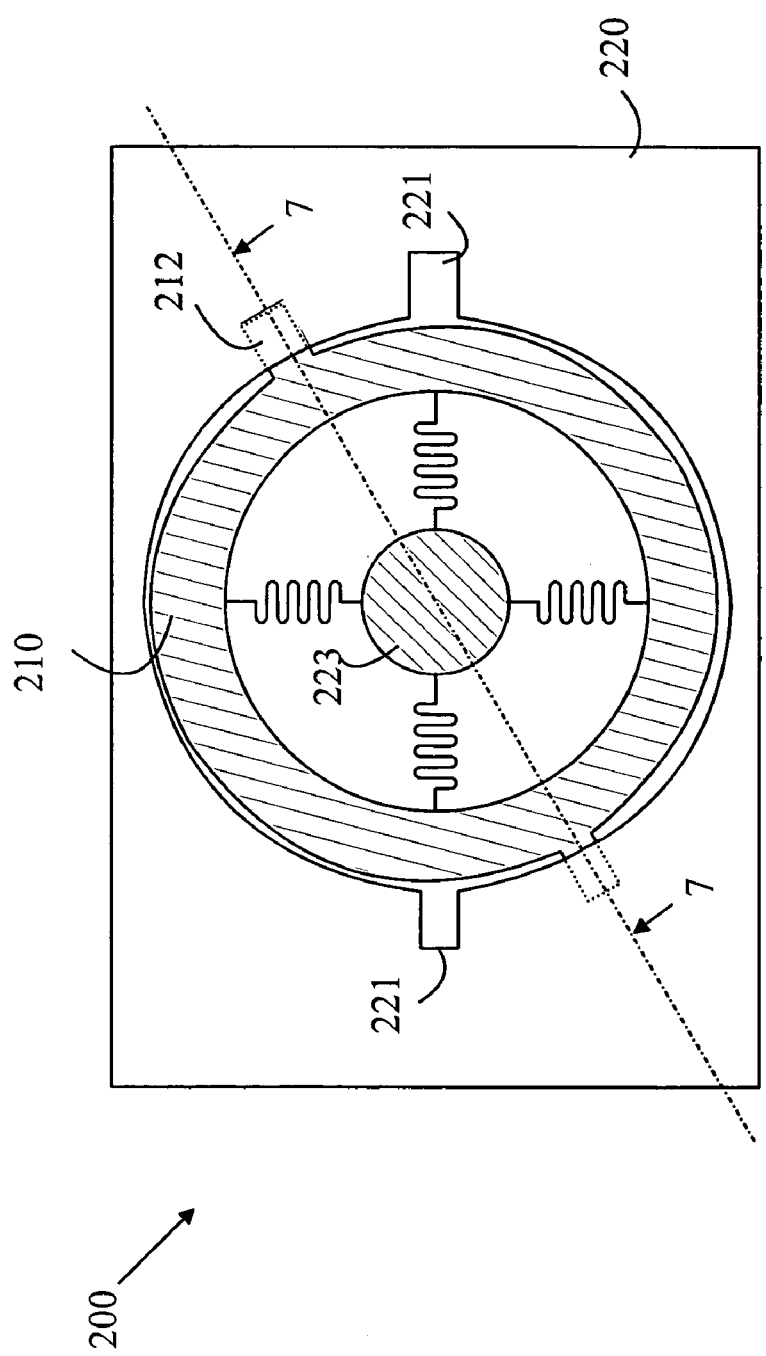

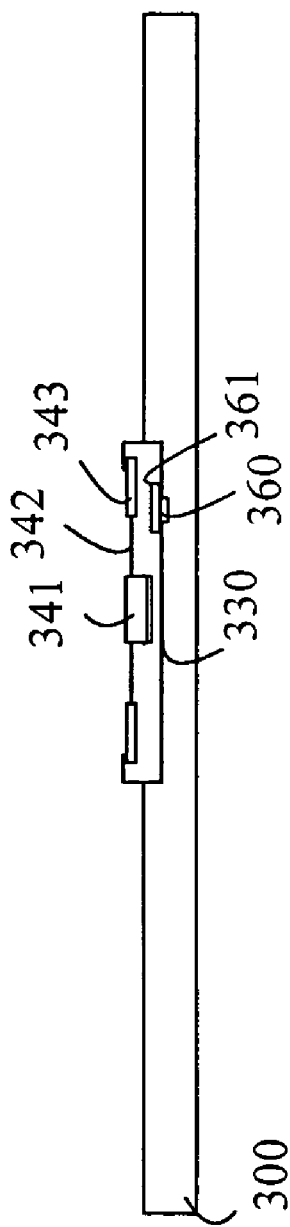
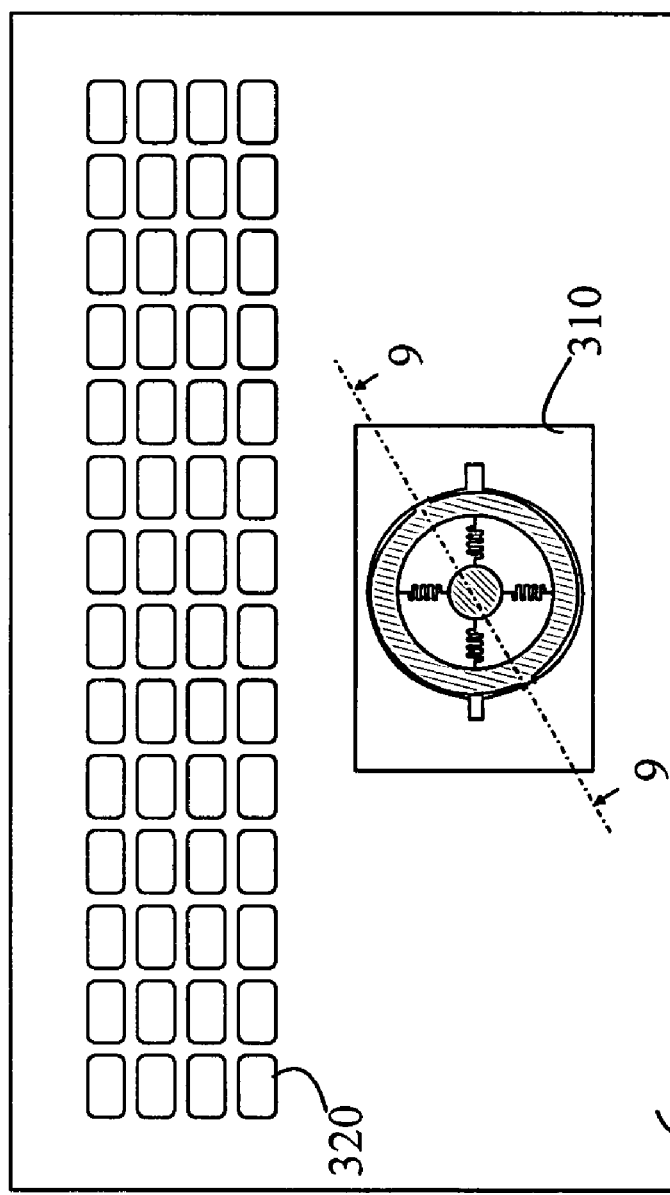

MODULAR ASSEMBLY FOR A SELF-INDEXING COMPUTER POINTING DEVICE

FIELD OF THE INVENTION

The present invention relates to pointing devices for use with computers and the like.

BACKGROUND OF THE INVENTION

Modem computer operating systems and graphics programs require a pointing device for controlling the position of a cursor on the computer display. For desktop PCs, the most successful pointing device is the "mouse". A mouse is a hand held object that is moved over a flat surface near the keyboard to control the motion of a cursor on the computer display. The direction and distance over which the mouse is moved determines the direction and distance the cursor moves on the display. A conventional mouse provides a rigid object that a user can move with great precision. For a desktop computer, the mouse provides a satisfactory solution to the pointing problem. On the occasion when the workspace is not large enough to provide a path over which the mouse can move and accommodate the desired cursor movement on the display, the user simply picks up the mouse and re-centers the mouse in the workspace.

While the mouse has provided a satisfactory solution to the pointing device problem in the desktop PC market, a similarly successful device is not available for portable and hand-held computers. These computers are often used in environments that lack a sufficiently large flat surface near the keyboard over which a mouse can be moved. Hence, some other form of pointing device is needed when these computers are used in such environments.

A pointing device for use in these environments must solve the problem of moving a cursor quickly and accurately. In addition, the device must operate in an intuitive fashion that a novice user can comprehend without extensive instruction. In addition, the pointing device must operate in a limited workspace and fit within the form factor of the computer or hand held device. Finally, the usual constraints of low cost, low power consumption and high reliability must also be met.

Currently, there are two dominant solutions to the pointing device problem in the laptop marketplace, the Synaptics capacitive TouchPad™ and the IBM TrackPoint™. Other companies make versions of these devices with similar functionality. Both of these fall far short of satisfying the above requirements. The TrackPoint™ is a small button that is typically placed in the center of the laptop keyboard. The button may be moved in a manner analogous to a "joy stick" by applying a lateral force to the top of the button with a finger. Unfortunately, the button can only move a small amount; hence, the displacement of the button cannot be mapped directly into a displacement in the cursor position on the computer display. Instead, the button displacement controls the direction and speed with which the cursor moves. The accuracy with which a user can position the cursor using this type of velocity control is significantly less than that achieved with a conventional mouse. This limitation is particularly evident in tasks that require small, precise movements such as drawing in a computer graphics program.

The TouchPad™ is a blank rectangular pad, 50-100 mm on a side, typically placed in front of the keyboard of most laptops. The device senses the position of a finger on the surface of the rectangle relative to the edges of the device. This sensing is accomplished by measuring the capacitance changes introduced by a user's finger on a series of electrodes beneath an insulating, low-friction material.

Like the TrackPoint™, the TouchPad™ also suffers from lack of precision. It is inherently difficult to measure the capacitive changes introduced by the user, who is at an unknown potential relative to the circuit. Furthermore, the contact area of the user's finger is relatively large. Hence, to provide an accurate measurement of the finger position, the device must determine some parameter such as the center of the contact area between the finger and the pad. Unfortunately, the contact area varies in size and shape with the pressure applied by the user. Therefore such determinations are, at best, of limited precision. In practice, users are unable to repeatably execute precise movements.

There are also difficulties arising from false signals when the user inadvertently touches the pad with a finger or a wrist. In some devices, the "clicking" function of a conventional mouse is implemented by tapping on the pad. As a result, such inadvertent activation during typing causes the cursor to jump to a new location in the middle of the typing operation and the text being inserted at the new location.

Devices based on a "puck" that the user moves with his or her finger provide higher levels of precision, since the position of the puck within the allowed field of motion can be precisely determined. In addition, the puck can move a much larger distance than the joystick utilized in the TrackPoint™ system discussed above.

While puck-based pointing devices provide greater input precision, cleaning and replacing the puck presents unique problems. The puck must slide over the surface in the puck field of motion smoothly with a low-friction "feel" without allowing dirt to enter the mechanism. In addition, the puck mechanism is more difficult to clean if dirt enters the mechanism. Finally, the puck components are more easily damaged, and hence, a method for inexpensively replacing the key components is needed.

SUMMARY OF THE INVENTION

The present invention includes a pointing device having a puck sub-assembly and a base sub-assembly. The puck sub-assembly includes a moveable puck confined to move within a puck field of motion. The puck sub-assembly includes a support member having an opening therein that determines a boundary for the puck field of motion. The base sub-assembly includes a base surface over which the puck moves, a position detector that measures the position of the puck in the puck field of motion, and an attachment mechanism. The attachment mechanism connects the base sub-assembly to the puck sub-assembly such that the puck sub-assembly is reversibly separable from the base assembly. The base surface is accessible when the puck sub-assembly is separated from the base assembly. In one embodiment, the puck sub-assembly further includes a restoring mechanism that returns the puck to a predetermined area in the puck field of motion. In another embodiment, the support member also includes a first contact that mates with a corresponding second contact in the base sub-assembly for making an electrical connection between the puck and the base sub-assembly. The puck is preferably electrically connected to the first contact through a spring that returns the puck to a predetermined area in the puck field of motion.

BRIEF DESCRIPTION OF THE DRAWING

FIG. 6 illustrates a top view of another embodiment of a pointing device according to the present invention.

FIG. 7 is a cross-sectional view of the pointing device shown in FIG. 6 through line 7-7.

FIG. 8 is a top view of a laptop computer having a pointing device according to one embodiment of the present invention.

FIG. 9 is a cross-sectional view of the laptop computer shown in FIG. 8 through line 9-9.

DETAILED DESCRIPTION OF THE PREFERRED EMBODIMENTS OF THE INVENTION

Figure 1A:
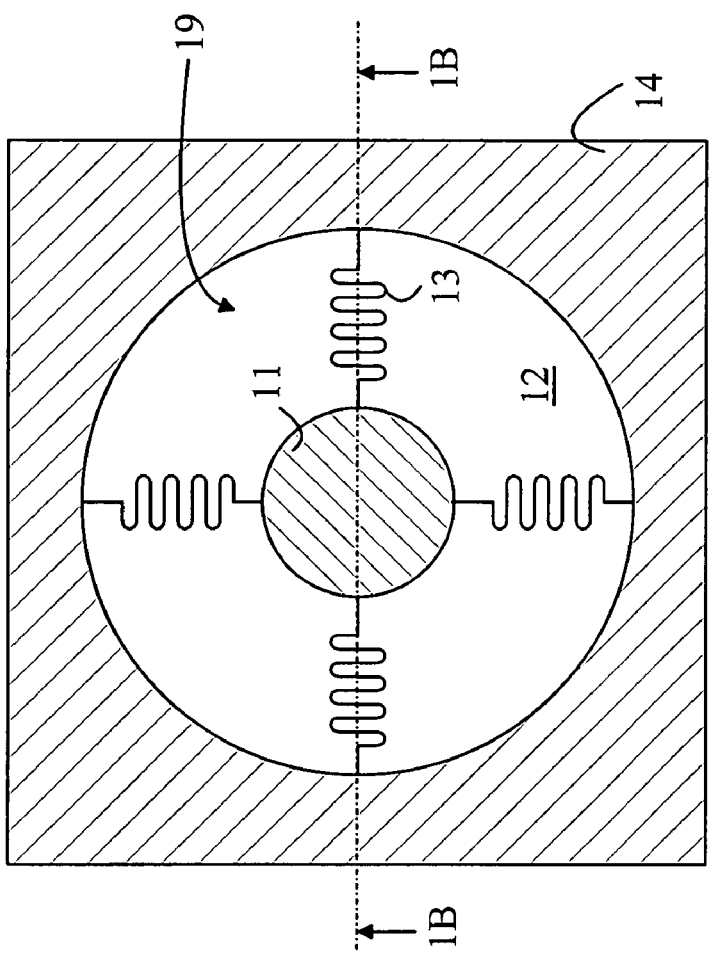
FIG. 1A illustrates a top view of a puck-based pointing device.
Figure 1B:
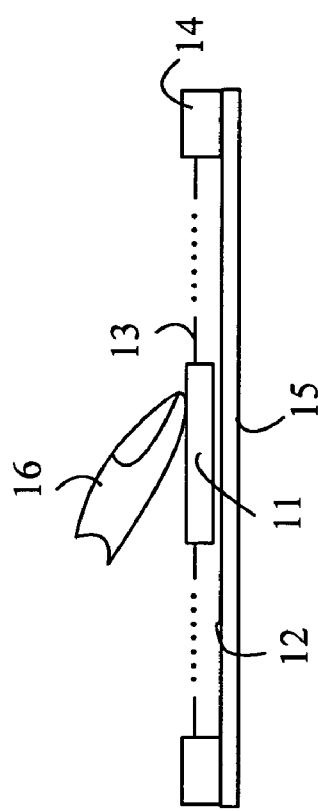
FIG. 1B is a cross-sectional view of the pointing device shown in FIG. 1A through line 1B-1B.

The manner in which the present invention provides its advantages can be more easily understood with reference to FIGS. 1A-1B, which illustrate a puck based pointing device 10. FIG. 1A is a top view of pointing device 10 and FIG. 1B is a cross-sectional view of pointing device 10 through line 1B-1B shown in FIG. 1A. Pointing device 10 includes a puck 11 that moves over a surface 12 of a substrate 15 within a puck field of motion 19 in response to a lateral force applied to puck 11. The force is typically applied to puck 11 by a user's finger, fingertip, thumb, thumb tip or multiple fingers. Puck 11 includes a pressure sensing mechanism that measures the vertical pressure applied to puck 11. In addition, pointing device 10 includes a sensing mechanism for determining the position of puck 11 on surface 12.

The puck is typically used to control a cursor on a display. When the user applies a vertical force to puck 11 that is greater than a predetermined threshold, any change in the position of puck 11 on surface 12 is reported to the host apparatus of which pointing device 10 forms part. This change in position is used to move the cursor on the display by a magnitude and direction that depends on the magnitude and direction of the motion of puck 11 while the vertical force was applied to puck 11. That is, if the motion of the puck is characterized by a distance d and a direction defined by an angle $\phi$ on the pointing device, the motion of the cursor is characterized by a distance D and a direction defined by angle $\phi$ on the display. A hardware driver in the host apparatus usually sets the relationship between D and d.

When the user releases puck 11 by removing the user's finger 16, puck 11 is returned to its centered position by the springs shown at 13 that connect the puck to the side 14 of the puck field of motion. Since the user's finger is not applying a vertical force to puck 11 during its return, the change in position associated with that return motion is not reported to the host apparatus. This provides a convenient "re-centering" capability, typically achieved on a mouse by lifting and replacing the mouse at the center of the field of motion. It is particularly necessary for laptop computers, hand-held devices and other miniature apparatus in which the field of motion is constrained.

While the pointing device described above provides many improvements over the conventional pointing devices currently included in laptop computers, the pointing device requires periodic cleaning. Dirt and other debris can accumulate on the surface of the puck field of motion and interfere with the smooth motion of the puck over this surface. In addition, the springs that position the puck in the puck field of motion can be damaged. Finally, it would be advantageous to provide a design that can be easily customized to include a manufacturer's logo or a button arrangement that is more ideally suited to a left-handed user.

Figure 2:
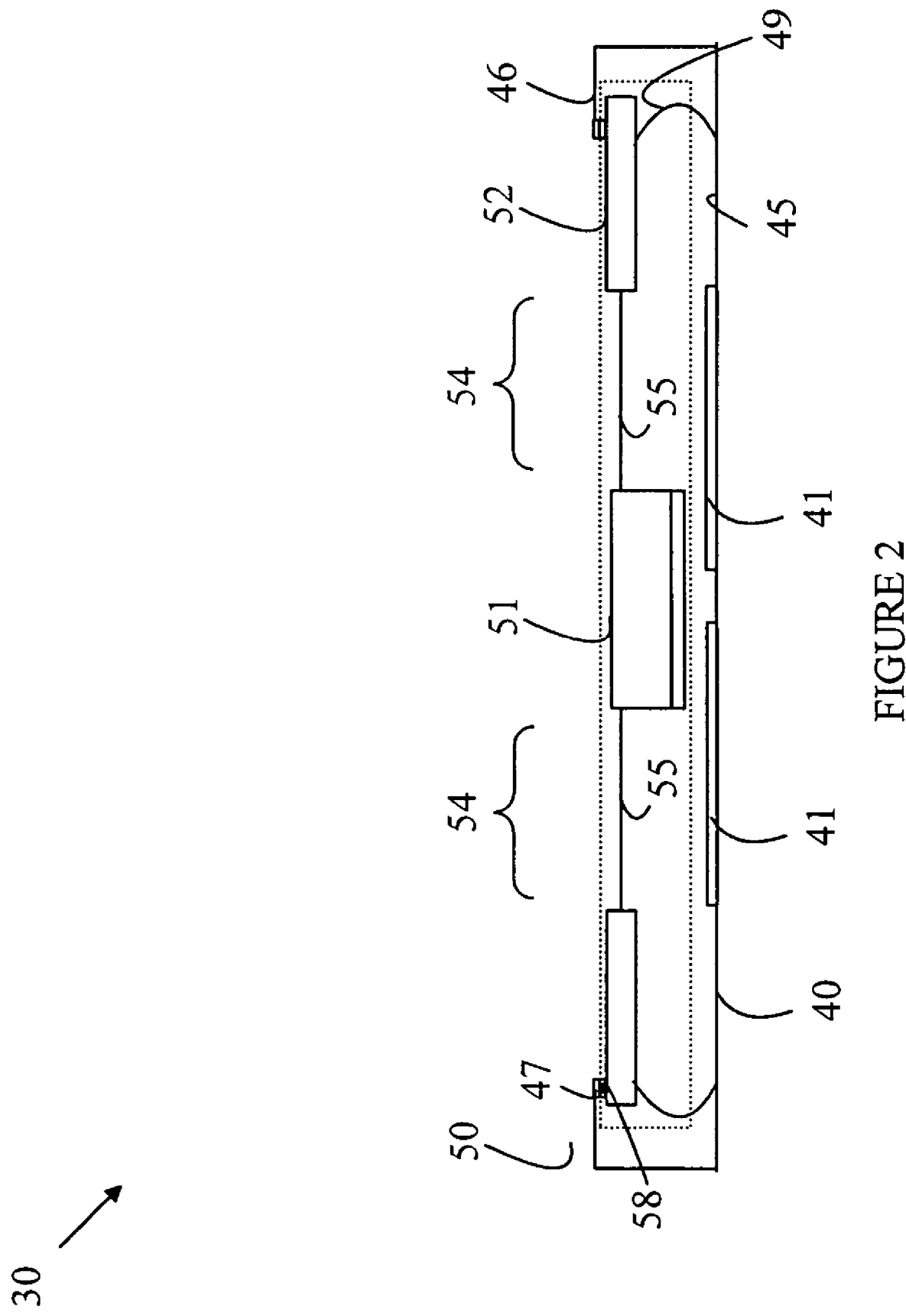
FIG. 2 is a cross-sectional view of a pointing device according to one embodiment of the present invention.

The present invention overcomes these problems by utilizing a two sub-assembly design to construct the pointing device. Refer now to FIG. 2, which is a cross-sectional view of a pointing device 30 according to one embodiment of the present invention. Pointing device 30 includes a base sub-assembly 40 and a puck sub-assembly 50. Puck sub-assembly 50 includes the puck 51, a plate 52 having an opening 54 that defines the puck field of motion, and the springs 55 that return puck 51 to a predetermined location within the puck field of motion when puck 51 is released.

Base sub-assembly 40 includes a surface 45 on which position sensors 41 are used to measure the location of the puck within the puck field of motion. A protective layer (not shown) that electrically insulates the sensors from the puck preferably covers these sensors. Base sub-assembly 40 may also include a controller that receives signals from sensors 41 and computes the location of puck 51 from those signals. The manner in which the position is determined will be discussed in more detail below.

Base sub-assembly 40 also includes a detent 46 for securing puck sub-assembly 50 in the base sub-assembly. Puck sub-assembly 50 preferably snaps into place base sub-assembly 40. Springs such as spring 49 may be used to hold puck sub-assembly 50 against detent 46. However, any mechanism that allows base sub-assembly 40 to be connected and disconnected to puck sub-assembly 50 without the use of specialized tools can be utilized. For example, a pointing device according to the present invention could utilize a plurality of screws to hold puck sub-assembly 50 and base sub-assembly 40 together.

As noted above, a pointing device such as pointing device 30 can collect dirt and other debris that can interfere with the smooth motion of the puck or the puck position sensing mechanism. Hence, a pointing device according to the present invention preferably allows a user thereof to disassemble the pointing device and clean the puck and underlying surfaces. In addition, a design that allows the user to easily replace the puck mechanism is preferred, since the springs and/or the puck components may become non-functional due to wear or misuse. Finally, manufacturers of specific computers or other host apparatus may wish to include a logo or other customized marking on the puck and surrounding plate. Accordingly, a design that allows the pointing device to be manufactured with any one of a plurality of specialized puck sub-assemblies is advantageous.

In addition, base sub-assembly 40 includes a plurality of connectors 47 that mate with corresponding connectors 58 on puck sub-assembly 40 for transferring signals from puck 51 to controller 42. The signals from puck 51 are preferably coupled to connectors 58 via one or more of springs 55. The springs in question are either made from an electrical conductor or have an electrical conductor embedded within or coated thereon.

Figure 3:
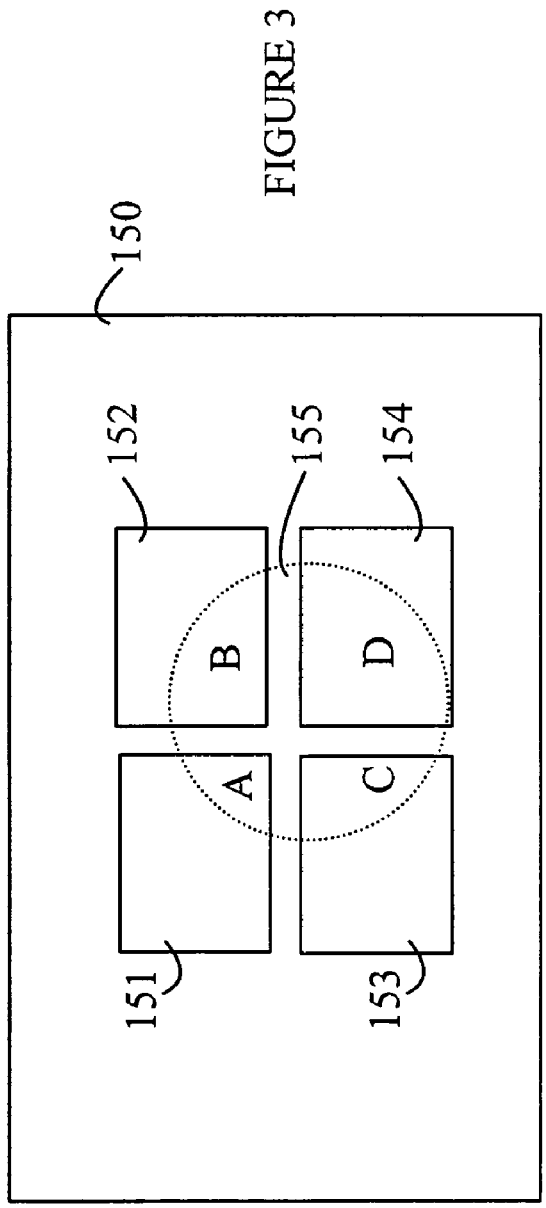
FIG. 3 is a top view of a portion of surface 12 shown in FIG. 1 over which the puck moves in one embodiment of the present invention.

The position of the puck in the puck field of motion can be sensed by any of a number of methods. In general, each method utilizes one or more components that reside in the base sub-assembly. One such position sensing mechanism is illustrated in FIG. 3. FIG. 3 is a top view of a portion of surface 12 shown in FIG. 1 over which the puck moves in one embodiment of the present invention. Surface 150 includes four electrodes shown at 151-154 having terminals that are connected to an external circuit. To simplify the drawing, these terminals have been omitted. The puck has a bottom surface that includes an electrode 155 that is shown in phantom in the drawing. Electrodes 151-155 are electrically isolated from one another. For example, electrode 155 can be covered with a layer of dielectric that provides the required insulation while still allowing electrode 155 to slide over the other electrodes. The electrodes can in fact be patterned on the back of the substrate whose surface is shown at 150. This reduces the capacitance to the puck electrode, but can be practical for substrate thicknesses of a few millimeters or less. The overlap between electrode 155 and each of electrodes 151-154 depends on the position of the puck relative to electrodes 151-154. Denote the overlaps between electrode 155 and electrodes 151-154 by A-D, respectively.

Figure 4:
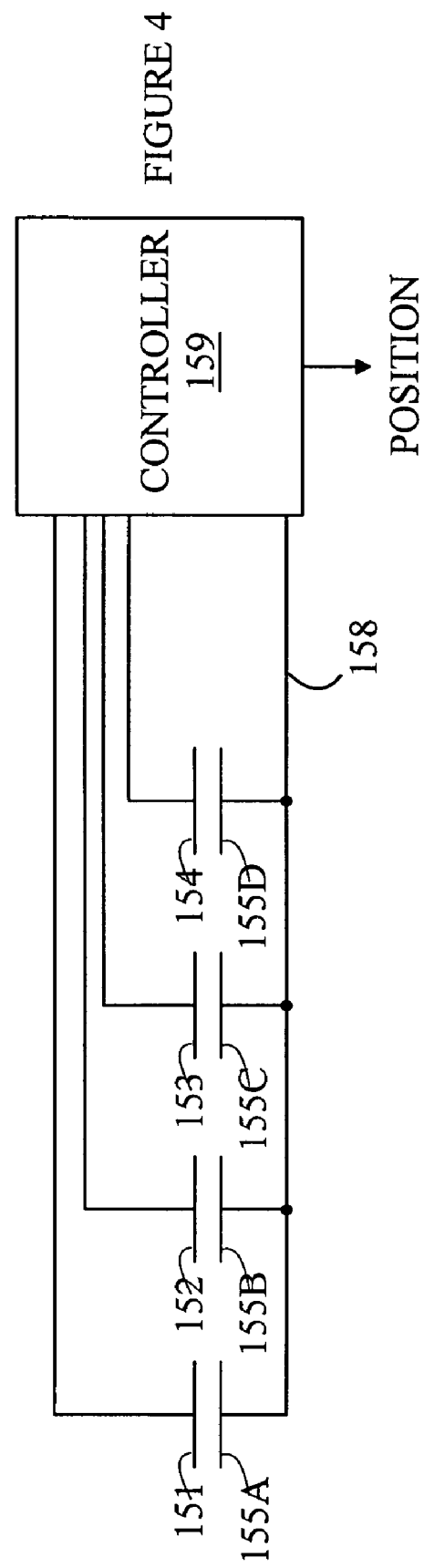
FIG. 4 is a schematic drawing of an equivalent circuit for electrodes 151-155.

Refer now to FIG. 4, which is a schematic drawing of an equivalent circuit for electrodes 151-155. The portion of electrode 155 that overlaps electrode 151 forms a parallel plate capacitor having a capacitance that is proportional to overlap A. Similarly, the portion of electrode 155 that overlaps electrode 152 forms a parallel plate capacitor that has a capacitance that is proportional to overlap B, and so on. Since all of the capacitors share portions of electrode 155, the equivalent circuit consists of four capacitors connected to a common electrode shown at 158. This electrode is just electrode 155. Hence, by measuring the capacitance between electrode 155 and each of electrodes 151-154, the position of electrode 155 relative to electrodes 151-154 can be determined. This determination can be made by a controller 159, which may be part of the pointing device or part of the host apparatus to which the pointing device is connected.

In embodiments in which the puck field of motion is substantially greater than the diameter of the puck, more than 4 electrodes can be placed on the substrate. Capacitance measurements between each of these electrodes and the puck can be used to determine the puck position as described above.

Figure 5:
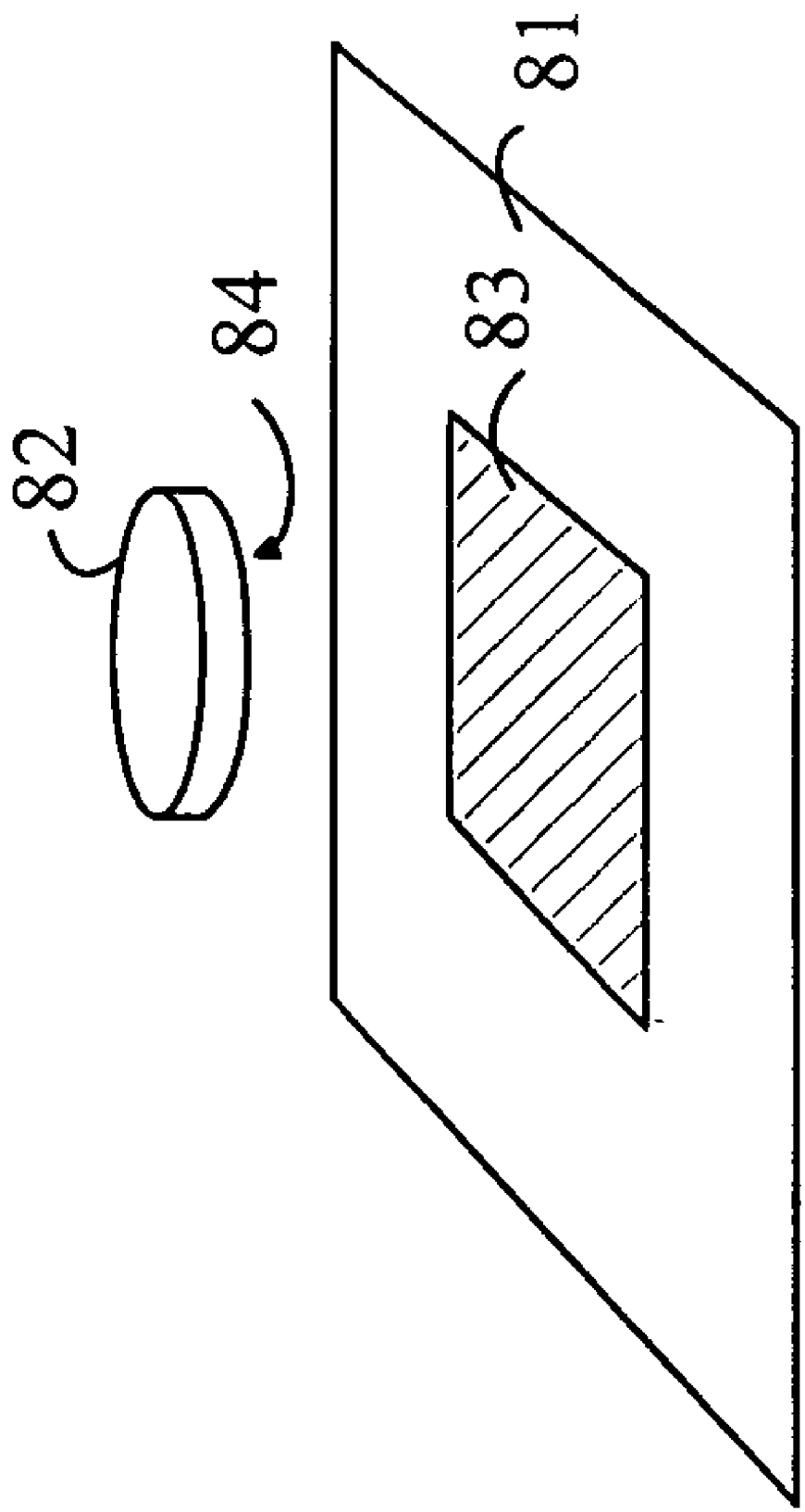
FIG. 5 illustrates a sensing mechanism using optical sensors to determine the position of the puck in the puck field of motion.

The position of the puck in the puck field of motion can also be ascertained using optical sensors such as those used in a conventional optical mouse. Refer now to FIG. 5, which illustrates such a sensing mechanism. In this embodiment, the bottom surface 84 of puck 82 is illuminated by an optical mouse sensor 83 located just below the surface 81 of the puck field of motion. Optical mouse sensors are known in the art, and hence, will not be discussed in detail here. For the purposes of the present discussion, it is sufficient to note that optical mouse sensor 83 has an illumination system that illuminates the bottom surface of puck 82 and an imaging sensor that forms an image of a portion of the illuminated surface. The imaging system compares successive images of the bottom surface to determine the magnitude and direction of the puck motion between the images.

The preceding examples of suitable position sensing mechanisms are provided as examples. However, it will be apparent from the preceding discussion that there are a large number of position-measuring mechanisms that can be utilized without departing from the teachings of the present invention.

The above-described embodiments of the present invention have utilized a particular attachment mechanism for connecting the puck sub-assembly to the base sub-assembly. However, numerous other attachment mechanisms can be utilized without departing from the present invention. Refer now to FIGS. 6 and 7, which illustrate another embodiment of a pointing device according to the present invention. FIG. 6 is a top view of pointing device 200, and FIG. 7 is a cross-sectional view of pointing device 200 through line 7-7 in FIG. 6. Pointing device 200 is constructed from a puck sub-assembly 210 and a base sub-assembly 220. Base sub-assembly 220 includes two slots 221 that are sized to allow the corresponding tabs shown at 212 to pass through the slots. Puck sub-assembly 210 is attached to base sub-assembly 220 by aligning the tabs with the slots. Once the tabs pass under the top surface of the base-assembly, the puck sub-assembly is rotated until the tabs engage corresponding receptacles 226.

The electrical connections between puck sub-assembly 210 and base sub-assembly 220 are made via contacts on the tabs that engage corresponding contacts in the slots. An exemplary pair of contacts is shown at 215 and 225. These contacts allow connections to the electrodes in puck 223 to be made to the controller 235 in base sub-assembly 220. Controller 235 is also connected to the position sensing electrodes shown at 222.

The attachment mechanism shown in FIGS. 6 and 7 does not require any tools. The user can remove the puck sub-assembly merely by twisting the puck sub-assembly until the tabs are aligned with the slots. Suitable indentations or protrusions can be provided on the surface of puck sub-assembly 210 to aid the user in manipulating the puck sub-assembly. Hence, a user can easily remove the puck assembly for cleaning and/or replacement. Once the puck sub-assembly is removed, the base sub-assembly and any electrodes on the bottom of the puck itself can be cleaned.

The present invention is particularly well suited for implementation on a laptop computer or other host apparatus having limited space for a pointing device. Refer now to FIGS. 8 and 9, which illustrate a laptop computer having a pointing device according to one embodiment of the present invention. FIG. 8 is a top view of laptop computer 300, and FIG. 9 is a cross-sectional view through line 9-9 in FIG. 8. To simplify the drawing, the display has been omitted from the drawings. Pointing device 310 is preferably located adjacent to the keyboard 320 of laptop 300. Base sub-assembly 330 is affixed to the laptop and may be mounted in a well on the surface adjacent to the keyboard to provide a thinner overall laptop form factor. Alternatively, base sub-assembly 330 can be molded into the surface of the laptop computer. In one embodiment, the base sub-assembly is attached to this surface in a manner that prevents the user from removing the base sub-assembly. Connections between the pointing device and the laptop are provided under the base sub-assembly in this embodiment. Exemplary connectors for providing these connections are shown at 360 and 361. This arrangement allows the base sub-assembly to be sealed to the laptop computer in a manner that prevents liquid or debris from entering the laptop computer through the pointing device.

The puck sub-assembly attaches to the base sub-assembly in a manner analogous to that described above. The attachment mechanism allows the puck sub-assembly to be easily removed by the user for cleaning and/or replacement. The puck sub-assembly includes the puck 341, the springs 342, and a top plate 343. Top plate 343 has a hole that defines the puck field of motion and the attachment mechanism for connecting the puck sub-assembly to the base sub-assembly.

The above-described embodiments of the present invention have been described in terms of a pointing device for use with a laptop computer. However, it will be apparent from the preceding discussion that the present invention may be utilized in a number of different data input environments. For example, a pointing device according to the present invention can be a stand-alone pointing device that replaces a conventional mouse. Similarly, the pointing device of the present invention can be used as a pointing device on a PDA or cellular telephone for making selections from menus on these devices.

Various modifications to the present invention will become apparent to those skilled in the art from the foregoing description and accompanying drawings. Accordingly, the present invention is to be limited solely by the scope of the following claims.

What is claimed is:

1. A pointing device comprising:
    a puck sub-assembly comprising:
        a moveable puck confined to move within a puck field of motion;
        a support member having an opening therein that determines a boundary for said puck field of motion; and
        a first electrical contact;
    a base sub-assembly comprising:
        a base surface over which said puck moves;
        a position detector that measures the position of said puck in said puck field of motion; and
        a second electrical contact that mates with said first contact for making an electrical connection between said puck sub-assembly and said base sub-assembly; and
    an attachment mechanism for connecting said base sub-assembly to said puck sub-assembly such that said puck sub-assembly is reversibly separable from said base assembly, and said base surface is accessible when said puck sub-assembly is separated from said base assembly.

2. The pointing device of claim 1 wherein said moveable puck includes a user sensor that detects the interaction of a user and said puck.

3. The pointing device of claim 1 wherein said base sub-assembly is separable from said puck sub-assembly without the use of tools.

4. The pointing device of claim 1 wherein said puck sub-assembly further comprises a restoring mechanism that returns said puck to a predetermined area in said puck field of motion.

5. The pointing device of claim 4 wherein said restoring mechanism comprises a spring connected to said puck.

6. The pointing device of claim 1 wherein said puck is electrically connected to said first contact through a spring that returns said puck to a predetermined area in said puck field of motion.

7. The pointing device of claim 1 wherein said position sensor comprises a plurality of surface electrodes on said surface and a puck electrode that moves with said puck.

8. The pointing device of claim 1 wherein said base sub-assembly is attached to a portable host apparatus.

9. The pointing device of claim 1 wherein said base sub-assembly is integral with a portable host apparatus.

* * * * *